C. H. BARROWS.
Carriage.

No. 104,409. Patented June 21, 1870.

Witnesses:
A. Bennenendorf
Alex. F. Roberts

Inventor:
C. H. Barrows
per Munn & Co.
Attorneys.

United States Patent Office.

CHARLES H. BARROWS, OF WILLIMANTIC, CONNECTICUT.

Letters Patent No. 104,409, dated June 21, 1870.

IMPROVEMENT IN THREE-WHEELED CARRIAGES.

The Schedule referred to in these Letters Patent and making part of the same.

*To all whom it may concern:*

Be it known that I, CHARLES H. BARROWS, of Willimantic, in the county of Windham and State of Connecticut, have invented a new and useful Improvement in Three-wheeled Carriages; and I do hereby declare that the following is a full, clear, and exact description thereof, which will enable others skilled in the art to make and use the same, reference being had to the accompanying drawing forming part of this specification.

Similar letters of reference indicate corresponding parts.

Figure 1:
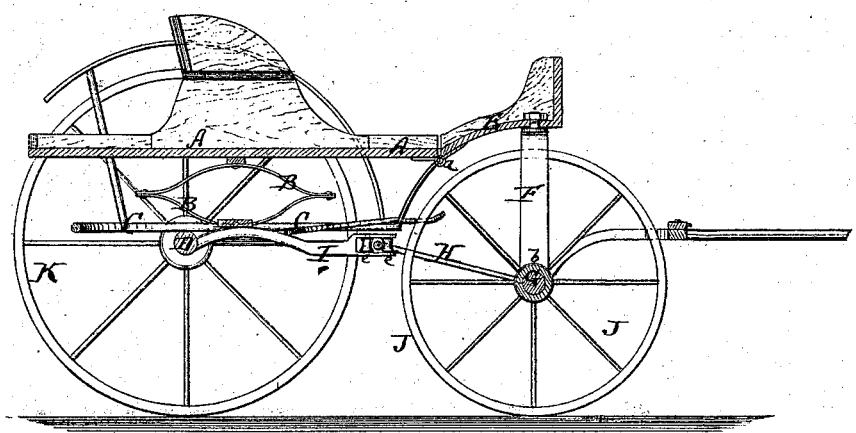
Figure 1 represents a vertical longitudinal section of my improved carriage.

The object of my invention is improvement in three-wheeled carriages; and

The invention consists in the construction and arrangement of parts as hereinafter described, and as particularly specified in the claim.

A in the drawing represents the main part of the carriage-body. It is supported by springs B B, which rest on the rear frame C and axle D.

Figure 2:
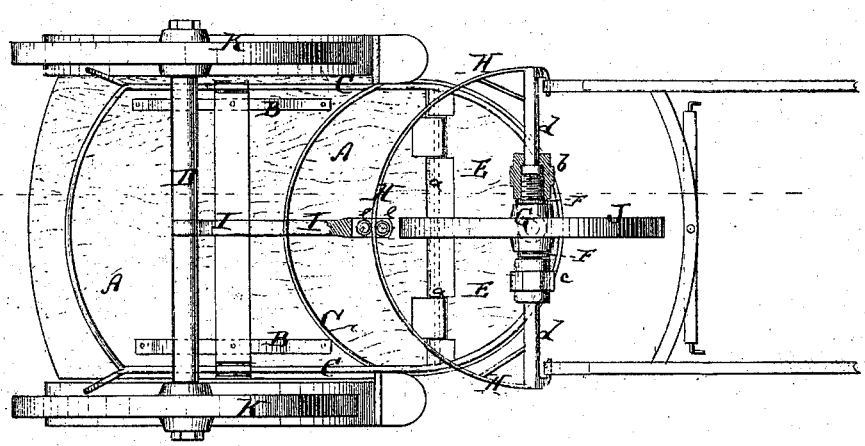
Figure 2 is an inverted plan view, partly in section, of the same.

The front part E of the carriage-body is hinged to the main part A, as at $a$, in figs. 1 and 2.

In the front part of the carriage-body is swiveled a bifurcated post, F, which, at its lower end, supports the front axle G. This front axle has right and left-hand screw-threads formed at its ends, and is, by means of nuts $b$ $c$, secured to the ends of rods or arms $d$ $d$, as shown. These rods or arms project inwardly from the ends of a semicircular bar, H, and are in line with the axle G, as shown.

The axle G is thus supported in the post F, and connected with the bar or steering-frame H. The latter works between two friction-rollers $e$ $e$, which are secured to the front end of the reach I, and can be swung to either side.

The front wheel J is hung loose upon the axle G.

The rear wheels K are hung upon the rear axle D in suitable manner.

The carriage-body, being jointed, permits its rear part to play up and down on the springs, while the front part is firmly supported by the front wheel.

The rear wheels can be set a suitable distance apart, to make the seat of suitable length.

By having the front wheel hung on the semicircular horizontal frame H, the steering of the vehicle will be made very easy, also the reversing, without backing.

Having thus described my invention,

I claim as new and desire to secure by Letters Patent—

1. The combination of the screw-threaded axle G, nuts $b$ $c$, arms $d$, and curved bar H, with the reach I and bifurcated post F, substantially as shown and described.

2. The combination of the body A and its hinged portion E, the swiveled bifurcated post F, axle G $d$, curved bars $h$, reach I, axle D, frame C, and springs B, all constructed and arranged substantially as shown and described.

CHARLES H. BARROWS.

Witnesses:
E. B. SUMNER,
A. J. GLAZIER.